Aug. 25, 1970 J. R. OWEN 3,525,804

GATED VIDEO DISPLAY

Filed April 10, 1968 3 Sheets-Sheet 1

Joseph R. Owen
INVENTOR.
BY John F. Miller
Agent
John M. Pease
Attorney

GATED VIDEO DISPLAY

Joseph R. Owen
INVENTOR.

BY John F. Miller
Agent

Attorney

Aug. 25, 1970 J. R. OWEN 3,525,804

GATED VIDEO DISPLAY

Filed April 10, 1968 3 Sheets-Sheet 3

Joseph R. Owen
INVENTOR.

BY John F. Miller
Agent
John W. [signature]
Attorney

United States Patent Office 3,525,804

Patented Aug. 25, 1970

3,525,804

GATED VIDEO DISPLAY

Joseph R. Owen, Orlando, Fla., assignor to the United States of America as represented by the Secretary of the Navy Filed Apr. 10, 1968, Ser. No. 720,172

Int. Cl. H04n *1/38*

U.S. Cl. 178—6 5 Claims

ABSTRACT OF THE DISCLOSURE

In some TV type simulators used in naval training devices, a target such as the image of a ship is caused to move a particular distance on a TV monitor screen by introducing a proportional delay in the TV monitor (or camera) sweep voltage. The invention concerns a novel gating and control circuit for preventing an undesired reiteration of video information on the monitor screen which can result from delays of certain durations.

BACKGROUND OF THE INVENTION

This invention is in the field of TV control circuits. In TV type simulator circuits of the kind used in training devices, a TV image is caused to move about on a TV monitor screen by delaying camera sweep voltages with respect to monitor sweep voltages. This circuit provides positive blanking of the video information from the camera to keep unwanted images off the monitor screen. These images may appear under certain delay conditions which result in indeterminate gating signals and erratic operation of circuit elements.

SUMMARY OF THE INVENTION

The invention is an improved circuit to control the gating of video information from a TV camera to a TV monitor display screen in a naval warfare simulator such as the "Electronic Synthesizer" invented by Hanns H. Wolff. Circuits responsive to camera and monitor sync and blanking pulses, and to displacement of the sync pulse delay control, operate multivibrators and gates to eliminate unwanted reiteration of video information on the TV monitor screen when motion controls are in certain positions.

DESCRIPTION OF THE PREFERRED EMBODIMENT

The invention is an improved circuit to control the gating of video information from a TV camera to a TV monitor in a naval warfare simulator such as the "Electronic Synthesizer" described in copending U.S. patent applications No. 535,659 filed Mar. 14, 1966, and No. 580,835 filed Sept. 20, 1966, by Hanns H. Wolff.

Figure 1:
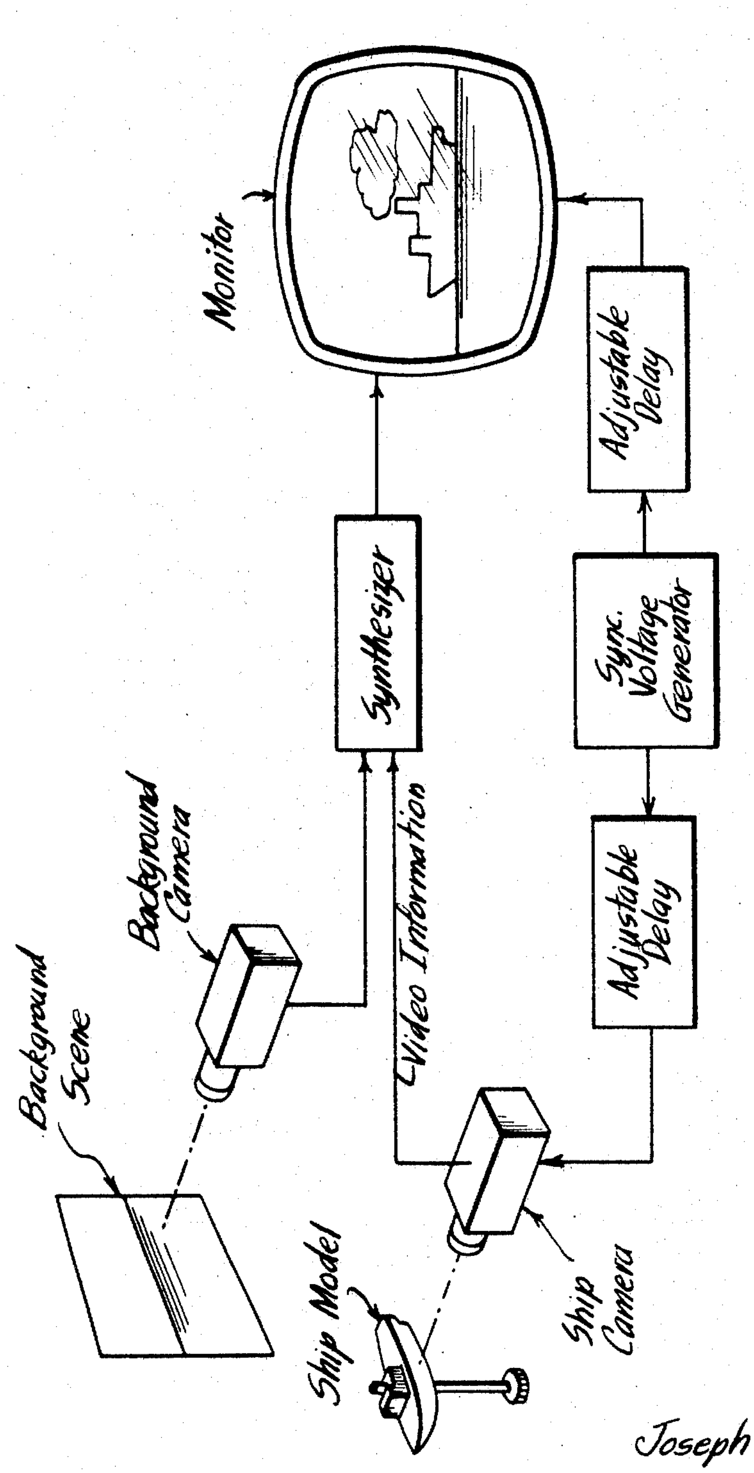
FIG. 1 illustrates the principle of an electronic synthesizer.

The principle of the electronic synthesizer is illustrated in FIG. 1 where two TV cameras respectively scanning a background scene and a model ship furnish video information to a synthesizing circuit which furnishes combined information to a TV monitor. Adjustable delay circuits between the system sync voltage generator and the monitor and ship camera sweep voltage circuits make it possible to move the ship on the monitor screen by delaying one of the camera or monitor sweep voltages with respect to the other. Means are provided for preventing the appearance of unwanted images on the monitor screen.

This invention provides a matrix of gates, logic circuits, and delay comparators cooperating to positively prevent the passage of erroneous video information from a camera or cameras to the monitor.

Figure 2:
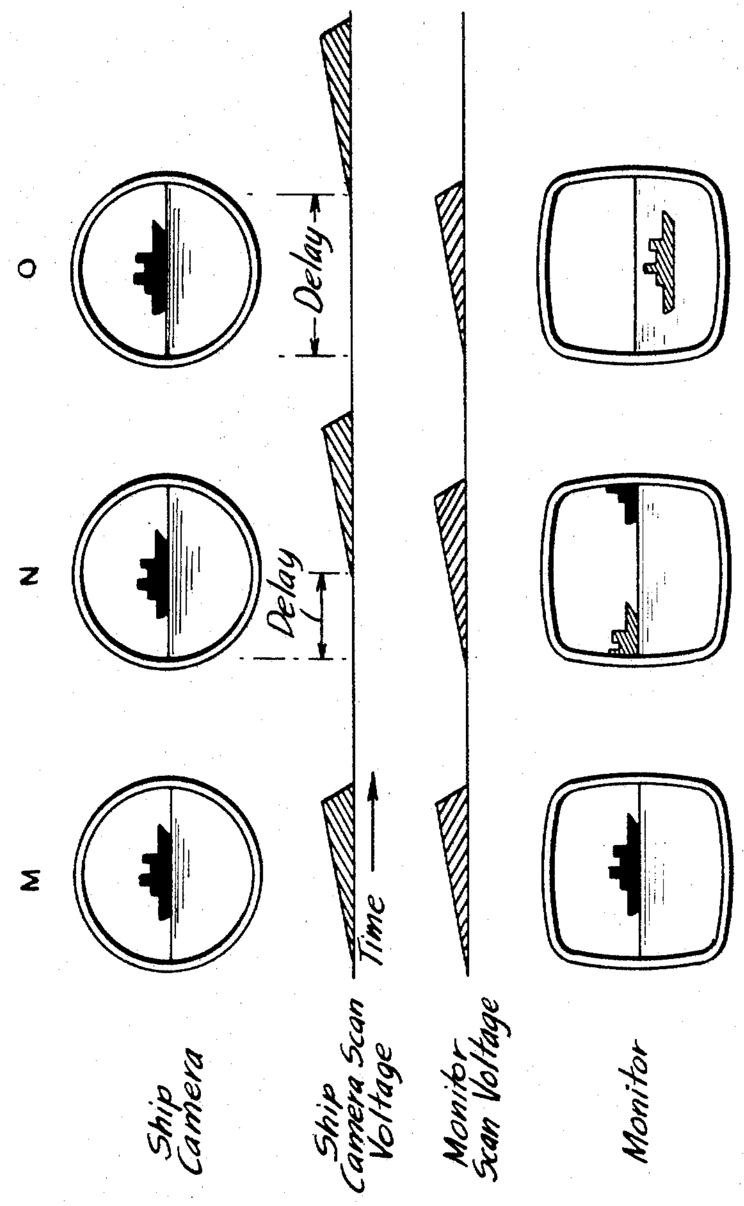
FIG. 2 illustrates a problem solved by the invention.

In FIG. 2 the problems which generated the invention are illustrated. As indicated in the first column, the top line of circles represents the screen in a TV camera which in the electronic synthesizer may be viewing a model ship. The second line shows the timing of the camera horizontal sweep voltages. The third line illustrates the timing of the monitor horizontal sweep voltage. Left to right and top to bottom scanning is assumed. As is known in the art, a sweep voltage is initiated by a sync pulse and ends with a blanking pulse. The fourth line represents a TV monitor screen which in the electronic synthesizer will display a composite scene comprised of a sea and sky background and the ship viewed by the associated camera. As shown in column M, if the model ship is centered in the camera view, a particular distance from the left side of the camera screen, the ship will be positioned a like distance from the left of the monitor screen. This is so because, as shown, the camera sweep voltage and the monitor sweep voltage are in phase and the respective scanning beams sweep across both camera and monitor screens simultaneously. However, in column N, the camera sweep voltage has been delayed for a time proportional to the distance shown in the second line. Therefore, the monitor scanning beam will be at a position farther to the right on the monitor screen when the camera scanning beam first encounters the model ship with the result that the ship image is moved to the right on the monitor screen. Column N also shows the effect which can occur in the absence of accurate blanking when a ship is moved off screen. Unless proper blanking is accomplished when the camera sweep voltage is delayed sufficiently to move a ship off screen, assuming a movement to the right, the rear part of the ship may appear on the right edge of the screen while the front half reappears on the left side of the screen as shown by the cross hatched front half on the monitor in column N. When the camera sweep voltage delay approaches a full horizontal scanning period to move a ship completely off screen, an unwanted image of the ship may appear centered in the monitor screen but displaced vertically as shown in column O. The invention provides improved circuitry for preventing the appearance of the unwanted images illustrated in FIG. 2.

Figure 3:
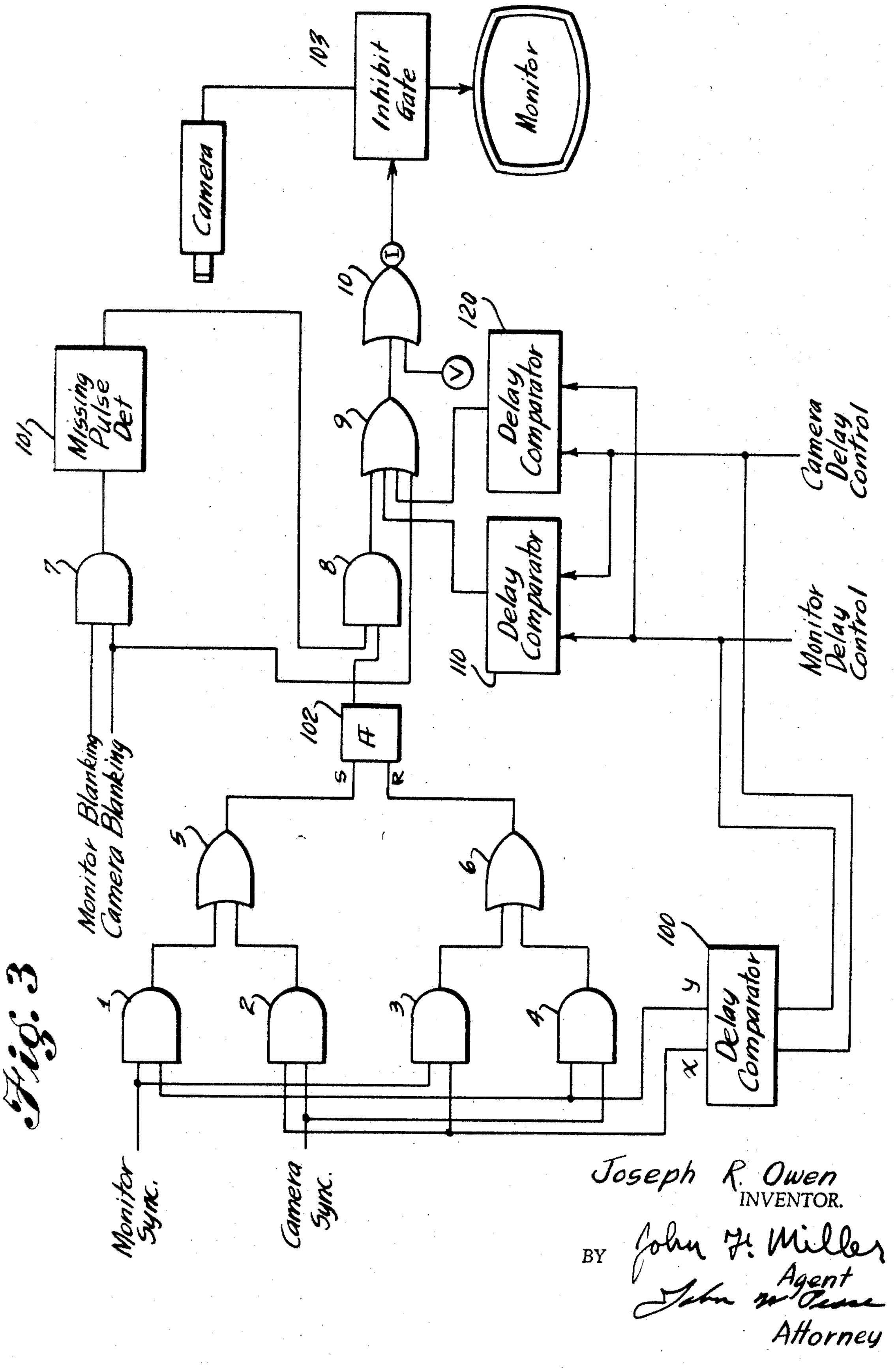
FIG. 3 shows the circuitry of the invention.

FIG. 3 shows the circuits of the invention. Four "and" gates 1, 2, 3, and 4 are connected as shown to receive inputs from the delayed monitor and camera sync voltages which initiate the sweep voltages, and a delay comparator 100. Delay controls are connected to the twin inputs of delay comparators 100, 110, and 120. When the camera sync pulse is delayed with respect to the monitor sync pulse, the X output voltage on the X output line of the delay comparator 100 will be positive with respect to the Y output voltage, and when the monitor sync pulse is delayed with respect to the camera sync pulse, the Y output voltage of 100 will be positive with respect to the X output. When the monitor blanking voltage and the camera blanking voltage appear at "and" gate 7 simultaneously or overlap by as much as one microsecond, the "and" gate has an output pulse which causes missing pulse detector 101 to have a low voltage output. When either of the blanking voltages lead the other, missing pulse detector 101 has a high voltage output.

Assuming now that the monitor sync pulse is delayed with respect to the camera sync pulse as determined by delay controls connected to the input of delay comparators 101, 110, and 120, the high Y output of 100 will enable "and" gates 1 and 4 so that an incoming monitor sync pulse will pass through "and" gate 1 and "or" gate 5 to set flipflop 102. This causes a high output voltage from 102 to pass through "and" gate 8 which is enabled by the high output of missing pulse detector 101 since the monitor and camera blanking voltages are not simultaneous. Gate 8 has a high output which passes through "or" gate 9 and causes "nor" gate 10 to have an inverted or low output. This low voltage applied to inhibit gate 103 inhibits any video information flow between the ship camera and the monitor after the arrival of the monitor sync pulse at "and" gate 1. This eliminates the unwanted image of the front half of the ship shown cross hatched on the left side of the monitor screen in column N of FIG. 2. No video information can pass from the ship camera to the monitor until the next camera sync pulse arrives at "and" gate 4 which is also enabled by the high voltage at the Y output of comparator 100. This causes a high output from gate 4 to pass through "or" gate 6 to reset flipflop 102. This blocks "and" gate 8 so that "nor" gate 10 has a high output thereby enabling gate 103 to pass video information from the ship camera to the monitor. This condition will persist until gate 103 is inhibited by the following monitor sync pulse in the manner described.

In a like manner when the camera sync pulses are delayed with respect to the monitor sync pulses, a high voltage on the X output of 100 enables "and" gates 2 and 3 so that an incoming camera sync pulse will pass through "and" gate 2 and "or" gate 5 to set flip-flop 102 which in due course inhibits gate 103 so that no video information passes to the monitor after the delayed camera sync pulse in the manner described. This will prevent the appearance of an unwanted image on the right side of the monitor screen when a ship is caused to move off the left side of the monitor screen. When neither sync pulse is delayed the monitor and camera blanking pulses will arrive at "and" gate 7 simultaneously. The output of 7 will cause missing pulse detector 101 to have a "0" output which inhibits gate 8. Therefore, no signal from gates 1, 2, 3, and 4 can pass through gate 8 to inhibit gate 103 regardless of any instability or transients in the gates and/or delay comparator 100. This is a valuable safety feature of the invention since it is not desired to block any video information while the camera and monitor sync voltages are in phase. An additional safety feature is provided by the camera blanking input to "or" gate 9 shown in FIG. 3. This inhibits gate 103 in the manner previously described to positively block any video information from the ship camera during the camera blanking period.

Delay comparators 110 and 120 are provided to preclude the condition illustrated in FIG. 2 when either the monitor or camera sync pulse is delayed one horizontal scanning period or more with respect to the other. When the monitor sync pulse is delayed with respect to the camera sync pulse a length of time equal to one horizontal scanning period the sync pulses will again occur simultaneously, but the delayed pulse will be positioned lower on the vertical sweep voltage scale. This will cause an image of a ship, which should have been moved completely off the screen as the delay of one sync pulse with respect to the other was increased from zero, to reappear in the center of the screen, displaced vertically. An example is shown in FIG. 2 as a complete ship image shown cross hatched in the lower center of the monitor screen in column O. Missing pulse detector 101 will have a low output, blocking gate 8 so that flipflop 102 has no effect on inhibit gate 103. Delay comparator 110 will detect the condition when the monitor sync pulse is delayed exactly one horizontal scanning period or more and have a high output voltage. This high output from 110 will pass through "or" gate 9 and "nor" gate 10 to inhibit gate 103 in the manner previously described so that no video information can pass. This is so because when the sync pulse delay is of this value the ship should be completely off screen and no image should appear on the monitor. In a like manner when the camera sync pulse is delayed exactly one horizontal scanning period or more, pulse delay comparator 120 has a high output which goes through gates 9 and 10 to inhibit gate 103 in the manner described.

It should be understood that a circuit similar to that shown in FIG. 3 is provided for the vertical deflection circuits of the "Electronic Synthesizer." Such a circuit would be connected to the V input of terminal of "nor" gate 10 as shown.

Obviously many modifications and variations of the present invention are possible in the light of the above teachings. It is therefore to be understood that within the scope of the appended claims the invention may be practiced otherwise than as specifically described.

The invention described herein may be manufactured and used by or for the Government of the United States of America for governmental purposes without the payment of any royalties thereon or therefor.

I claim:

1. In a control circuit for a TV simulator device, the improvement comprising:

a TV camera connected to furnish video information to a TV monitor, an inhibiting gate in said connection whereby the passage of video information from said camera to said monitor may be inhibited, control means for controlling said inhibiting gate, said control means comprising an array of "and" gates responsive to monitor sync pulses and camera sync pulses, said array of "and" gates being enabled to pass said monitor sync pulse or said camera sync pulse selectively by a first delay comparator, said first delay comparator being responsive to delay controls for said monitor sync pulse and said camera sync pulse.

2. The apparatus of claim 1 wherein said control means include a flipflop, a first "or" gate having an output connected to the set input of said flipflop, a second "or" gate having an output connected to the reset input of said flipflop, the inputs of said first and second "or" gates being connected to the outputs of said array of "and" gates, whereby said flipflop is set by a first of said sync pulses and reset by the following sync pulse.

3. The apparatus of claim 2 and including means whereby the output of said flipflop is gated to control said inhibiting gate.

4. The apparatus of claim 3 wherein said means for gating the output of said flipflop include an "and" gate connected to a missing pulse detector circuit whereby an output from said missing pulse detector circuit gates the output of said flipflop through said "and" gate, said missing pulse detector being responsive to monitor and camera blanking pulses.

5. The apparatus of claim 4 and including a second and a third delay comparator each responsive to controls for setting respectively different delay periods between sync pulses to forward an output voltage to said inhibiting gate through an "or" gate and a "nor" gate to thereby inhibit the transfer of video information from said camera to said monitor.

References Cited

UNITED STATES PATENTS 2,611,819 9/1952 Serrell -------------- 178—6

RICHARD MURRAY, Primary Examiner

B. L. LEIBOWITZ, Assistant Examiner

U.S. Cl. X.R.

178—68